United States Patent
Mundra et al.

(10) Patent No.: US 7,403,604 B2
(45) Date of Patent: Jul. 22, 2008

(54) METHOD AND APPARATUS FOR ACTIVATING EXTENDED SERVICES IN A USER DEVICE USING A VOICE OVER PACKET GATEWAY

(75) Inventors: Satish Kumar Manmal Mundra, Germantown, MD (US); Satyamurthy Yadavalli, Bangalore (IN); Manoj Sindhwani, Oak Hill, VA (US)

(73) Assignee: Texas Instruments Incorporated, Dallas, TX (US)

( * ) Notice: Subject to any disclaimer, the term of this patent is extended or adjusted under 35 U.S.C. 154(b) by 86 days.

(21) Appl. No.: 11/480,996

(22) Filed: Jul. 6, 2006

(65) Prior Publication Data
US 2008/0123670 A1    May 29, 2008

Related U.S. Application Data

(60) Provisional application No. 60/771,120, filed on Feb. 6, 2006.

(51) Int. Cl.
*H04M 1/56* (2006.01)
(52) U.S. Cl. ............................. 379/142.02; 379/142.04; 379/142.07; 379/88.11; 379/88.12; 370/352; 370/353; 370/354
(58) Field of Classification Search ................ 370/401, 370/352; 379/93.15, 93.23, 110.01, 93.05, 379/142.01, 142.02, 142.07, 215, 142, 373, 379/93.01, 93.02, 93.03, 93.17, 93.31, 67.1, 379/69, 74, 88.11, 88.19, 88.2, 88.21
See application file for complete search history.

(56) References Cited

U.S. PATENT DOCUMENTS

| | | | | |
|---|---|---|---|---|
| 6,404,868 | B1* | 6/2002 | Beamish et al. | 379/142.01 |
| 7,006,618 | B1* | 2/2006 | Shaffer et al. | 379/215.01 |
| 2003/0198323 | A1* | 10/2003 | Watanabe | 379/88.21 |
| 2004/0240432 | A1* | 12/2004 | Ying et al. | 370/352 |
| 2005/0105540 | A1* | 5/2005 | Baumann et al. | 370/401 |
| 2005/0190756 | A1* | 9/2005 | Mundra et al. | 370/389 |
| 2006/0159116 | A1* | 7/2006 | Gerszberg et al. | 370/431 |

OTHER PUBLICATIONS

"Access and Terminals (AT): Analogue access to the Public Switched Telephone Network (PSTN); Subscriber line protocol over the local loop for display (and related) services; Part 1: On-hook data transmission," *ETSI* EN 300 659-1 V1.3.1 (Jan. 2001).

(Continued)

*Primary Examiner*—Fan Tsang
*Assistant Examiner*—Simon King
(74) *Attorney, Agent, or Firm*—Steven A. Shaw; W. James Brady; Frederick J. Telecky, Jr.

(57) ABSTRACT

An enhanced services display message protocol (ESDMP) facilitates display of messages in a compliant analog telephony device (ATD). An exemplary gateway device in a voice over packet (VOP) network can activate enhanced services in a compliant ATD using the ESDMP and includes a controller and first and second interfaces. One of the interfaces can transmit and receive communications over a VOP network. The other interface can transmit and receive voice band message data modulated according to a frequency shift keying (FSK) protocol. The ESDMP can be used to configure the gateway to activate features supported by the ATD, to update call state information and to display feature state information.

30 Claims, 8 Drawing Sheets

OTHER PUBLICATIONS

"Access and Terminals (AT): Analogue access to the Public Switched Telephone Network (PSTN); Subscriber line protocol over the local loop for display (and related) services; Part 2: Off-hook data transmission," *ETSI* EN 300 659-2 V1.3.1 (Jan. 2001).

"Access and Terminals (AT): Analogue access to the Public Switched Telephone Network (PSTN); Subscriber line protocol over the local loop for display (and related) services; Part 3: Data link message and parameter codings," *ETSI* EN 300 659-3 V1.3.1 (Jan. 2001).

Yancy and Devlin-Allen, "Building Residential VoIP Gateways: A Tutorial Part Two: VoIP Telephony Interfaces," VoIP Group, Texas Instruments Incorporated.

\* cited by examiner

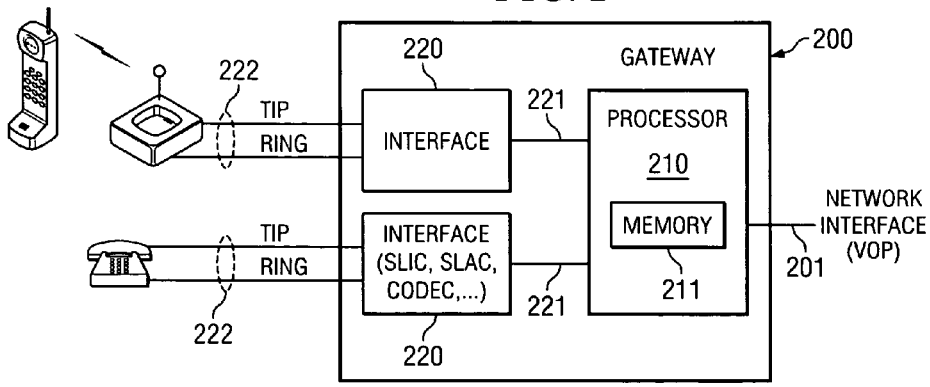
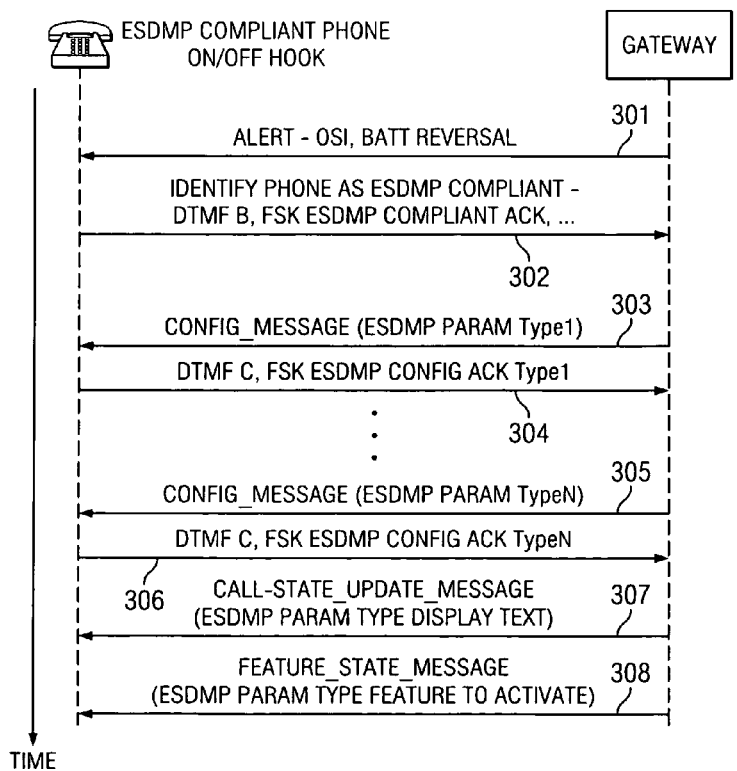

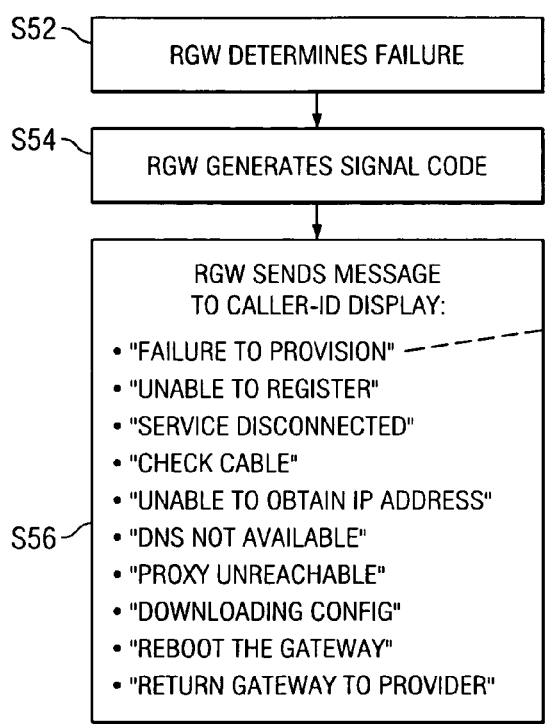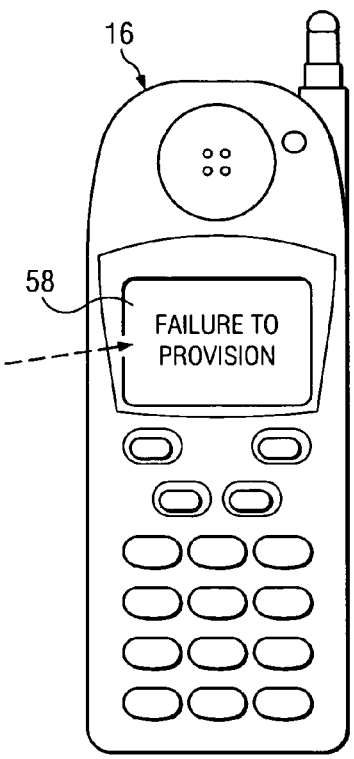
FIG. 5

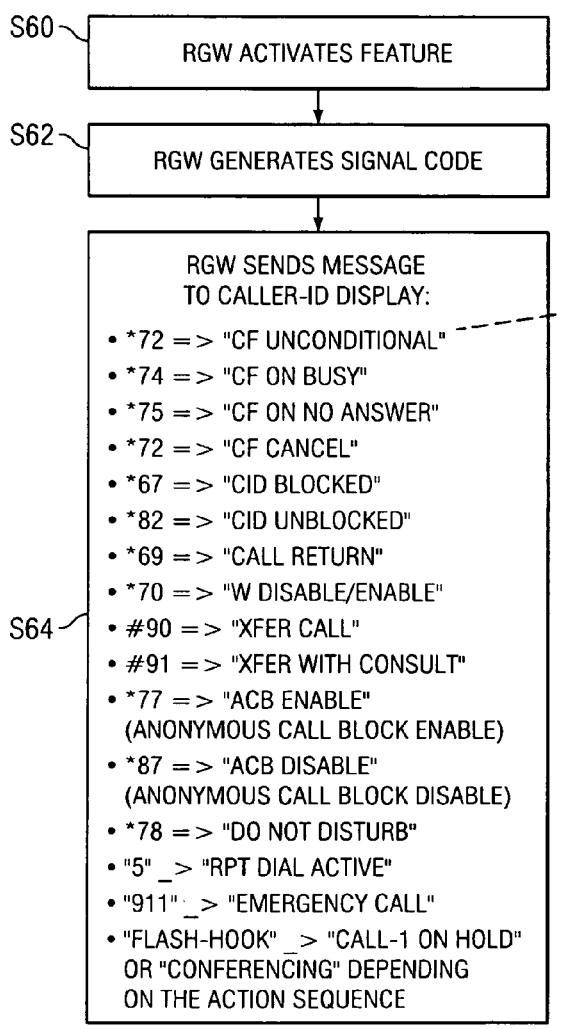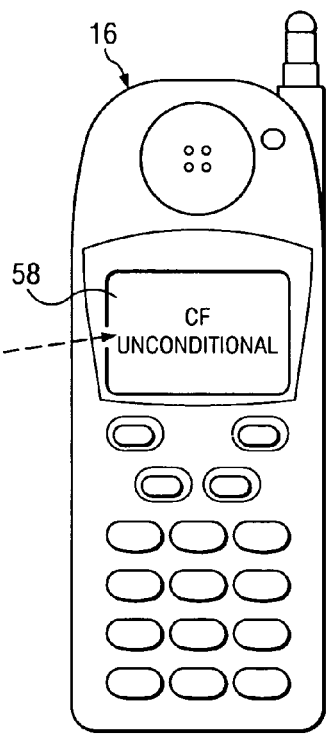
FIG. 6

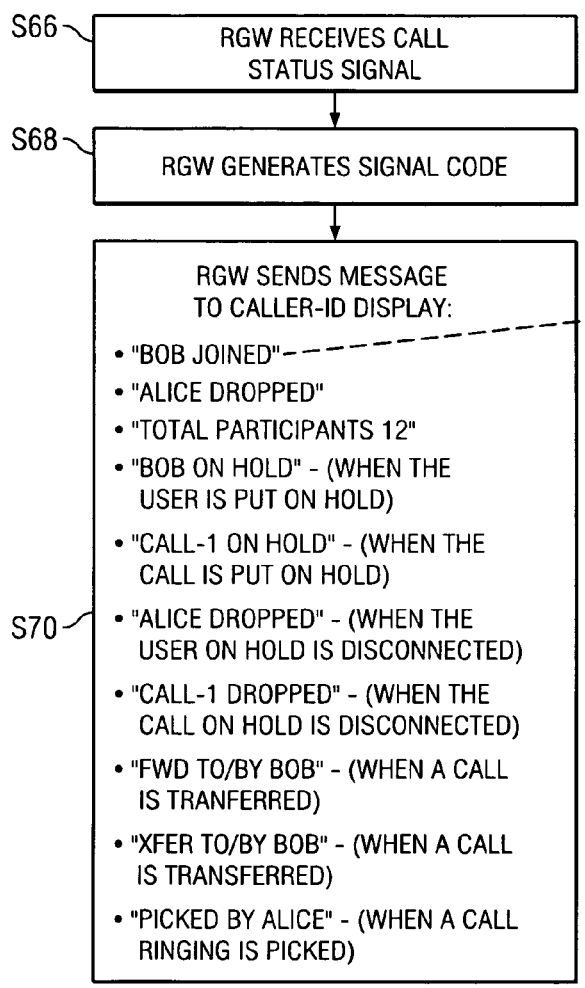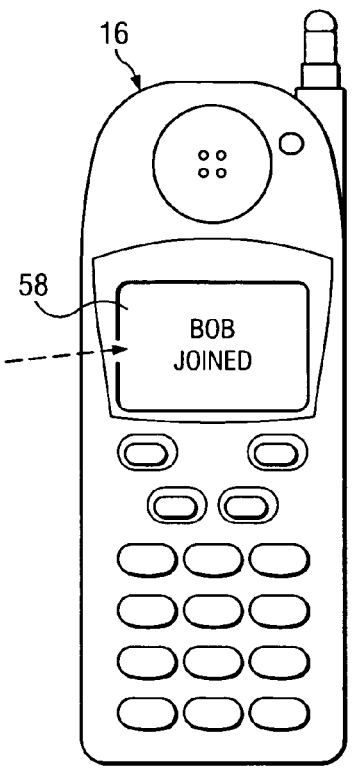
FIG. 7

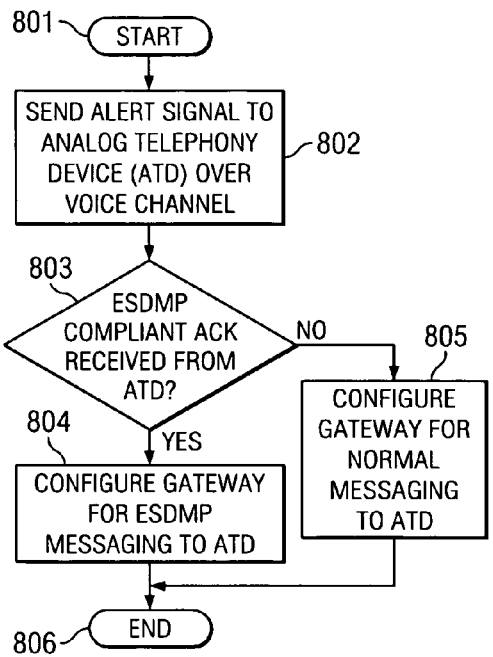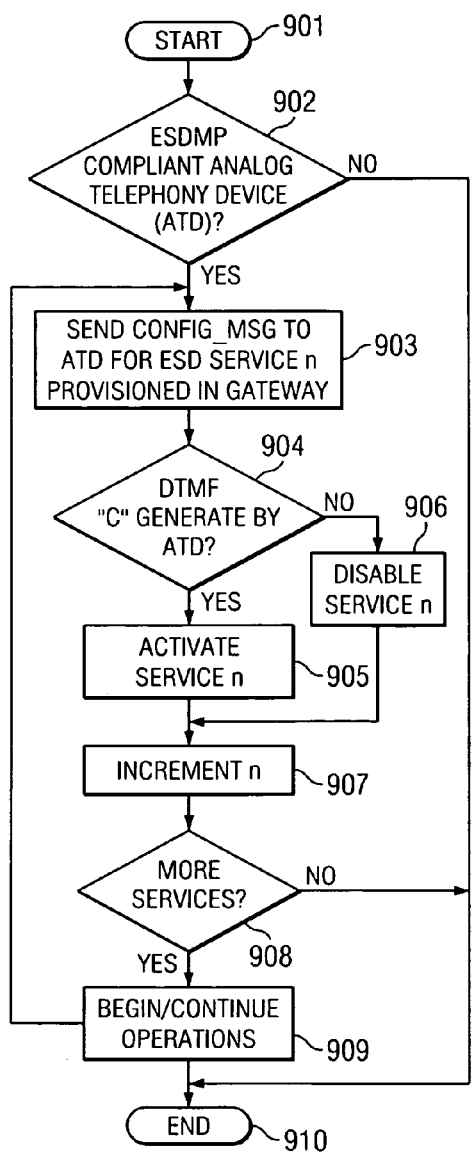

METHOD AND APPARATUS FOR ACTIVATING EXTENDED SERVICES IN A USER DEVICE USING A VOICE OVER PACKET GATEWAY

CROSS-REFERENCE TO RELATED APPLICATIONS

This application claims priority to and incorporates by reference U.S. Provisional Application No. 60/771,120, filed Feb. 6, 2006, entitled "Mechanism For Displaying Messages On Analog Phone (TDMP)"

STATEMENT REGARDING FEDERALLY SPONSORED RESEARCH OR DEVELOPMENT

Not applicable.

FIELD OF THE INVENTION

The present invention relates in general to voice band data communication, using standards such as voice-over-packet (VOP/VoIP) and Voice over Internet Protocol (VoIP) and more specifically to activating enhanced features on compliant devices for providing voice band communications on VOP or similar networks.

BACKGROUND OF THE INVENTION

In typical telecommunications systems, voice calls and data are transmitted by carriers from one network to another network. Networks for transmitting voice calls include packet-switched networks transmitting calls using VoIP, circuit-switched networks like the public switched telephone network (PSTN), asynchronous transfer mode (ATM) networks, and the like. Recently, VOP networks are becoming more widely deployed.

As VOP services expand to provide users with narrow band voice telephony over a broadband network connection to, for example, public networks such as the PSTN, the Internet or private networks using the Internet Protocol (IP), the need for enhanced services is increasing. VoIP telephony, by way of VOP networks, is being deployed in homes and in enterprises to reduce the system and service costs and to improve system capabilities. Improving the user experience and enabling new features and classes of applications with VoIP compliant systems has not been possible with traditional circuit-switched PSTN based telephony systems. The operation of the PSTN has not traditionally been packet oriented for a variety of reasons including the inability to overcome voice band fidelity issues associated with packet latency and the like. Since voice data is highly correlated, it is inherently intolerant to packet delay or reordering. Also, the use of circuit switching is, generally speaking, an inefficient use of communication resources and obviates the inherent healing properties and fault tolerance of packet networks.

With improvements in the transport speed of the packet networks, due in large measure to the use of broadband fiber and other high speed physical layer media in the subscriber loop, packet based services for critical real-time data such as voice data is now a reality. However, residential services for packet based voice systems still lag behind those typically provided in the PSTN. Since the present user experience associated with a VOP or VoIP telephone is typically indistinguishable from the standard PSTN user experience and, in some cases less feature-rich, additional features provided to users in the VOP environment may be required to make the use of VOP or VoIP telephones a more compelling choice for home consumers and, to some extent, enterprises.

Enterprises have traditionally benefited from the ability of sophisticated private branch exchange (PBX) systems to provide enhanced services. The deployment of VoIP phone systems within the enterprise typically involves an IP PBX (Internet Protocol Private Branch Exchange) including IP phones, which have a large display screen and keypad with many function keys. The typical IP phone in the IP PBX environment provides the enterprise user with ease-of-use of traditional features and the ability to add a new class of applications and new features that were not available with traditional analog telephones.

However, for home users the experience of using an IP phone coupled to a VOP network has been somewhat limited to services and features currently available from a traditional analog phone connected to the PSTN. The limitations are primarily attributable to the physical constraints posed by the requirement to use the standard RJ11 2-wire analog interface and the ability to translate the VOP features on to the analog telephone. Simply put, the typical analog telephone or telephony device is not equipped to accommodate the display of rich data and feature content which is available through the packet network to which it is attached. Although some services have been provided to residential users over the PSTN, for example, voice mailboxes, Call Waiting, Call Forwarding, distinctive ringing, Caller ID services, and the like, enhanced services are more difficult to provide to conventional devices or to devices coupled over conventional analog connections.

Some systems such as the system described in Attorney Docket No. TI-39017, have attempted to provide enhanced service information over, for example, a conventional Caller ID display. Such a solution however can cause cluttering of the Caller ID display with non-Caller ID data and is not equipped to provide additional features through the limited Caller ID messaging format.

BRIEF DESCRIPTION OF THE DRAWINGS

Exemplary embodiments of the invention are discussed hereinafter in reference to the following drawings, in which:

FIG. 2 is a diagram illustrating exemplary analog telephony devices (ATDs) and associated connections with an exemplary residential gateway having a processor, memory and network interface to a VOP interface;

FIG. 3 is a message flow diagram illustrating message flows between a gateway device and an ATD associated with an exemplary handshake procedure and other procedures;

FIG. 5 is a diagram illustrating an exemplary ESDMP compliant ATD and procedures for using a voice band data message format generated from a gateway device to display messages to notify a user of diagnostic information and/or other information;

FIG. 6 is a diagram illustrating an exemplary ESDMP compliant ATD and procedures for using a voice band data message format generated from a gateway device to display messages associated with the activation of call features;

FIG. 7 is a diagram illustrating an exemplary ESDMP compliant ATD and procedures for using a voice band data message format generated from a gateway device to display messages to notify a user of a call state or event update;

FIG. 8 is a flow chart illustrating an exemplary handshake procedure to verify that an ATD is compliant with the ESDMP;

FIG. 9 is a flow chart illustrating an exemplary configuration procedure with an ESDMP compliant ATD.

DETAILED DESCRIPTION

Figure 1:
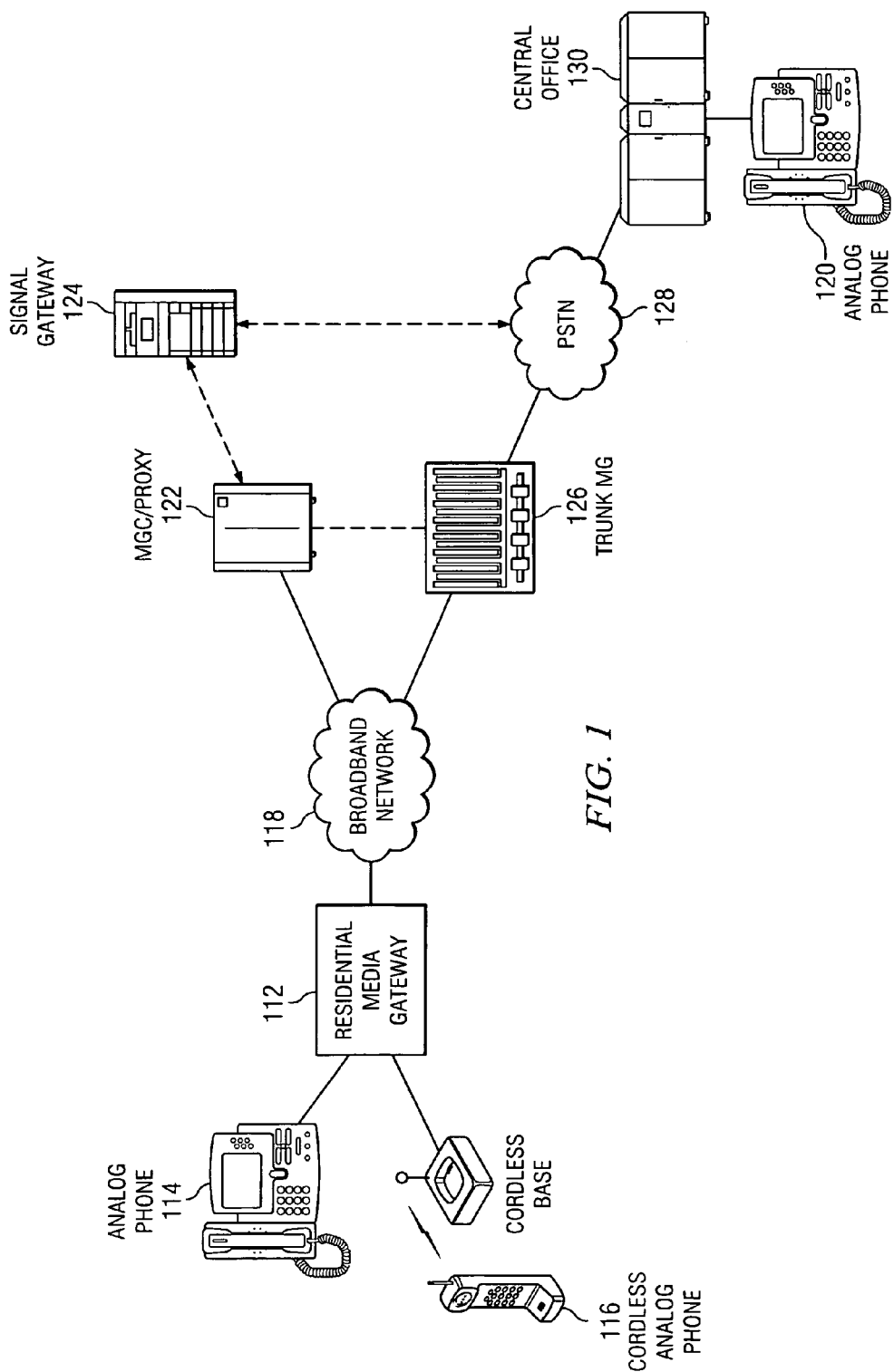
FIG. 1 is a network diagram illustrating an exemplary voice over packet (VOP) network.

In overview, the present disclosure concerns communication networks, often referred to as voice over packet (VOP) networks, such as may be associated with networks supporting voice communication between wireless and/or wire line devices, and the provision of services to analog telephony devices (ATDs) such as analog telephones having the ability to display message information and other information and having additional indicators such as light indicators, LEDs, bulbs, or the like, sound indicators such as speakers, sound transducers or the like. VOP communication networks may provide additional services such as data communications, signal, and/or video services.

Such networks can include gateway devices, which transfer and translate communications between ATDs and the VOP network, and between other ATDs such as those on a remote end of a virtual connection through the PSTN. It will be appreciated that communications can be transferred across one or a series of VOP networks or the like. More particularly, various inventive concepts and principles are embodied in systems, devices, and methods therein for providing enhanced service display messages in a VOP network using an enhanced services display message protocol (ESDMP) as discussed and described herein.

The gateway devices of particular interest are those providing or facilitating voice communications between ATDs and networks capable of giving rise to enhanced services messages, such as edge routers, media gateways, centralized media gateways, session border controllers, trunk gateways, media boxes, call servers, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

To better understand various exemplary embodiments of the invention as discussed and described herein, reference is made to FIG. 1. An example of the variety of network elements and other components needed to conduct a voice band call over a VOP network in accordance with VoIP standards is shown. A typical home access network includes a residential media gateway (RGW) 112, also referred to herein as a gateway device, connected to a broadband network 118. An end user at an analog wired phone 114 or a cordless analog phone 116 with a wired connection to the RGW 112 can place voice calls via a standard two-wire analog connection such as an RJ11 telephony port on the RGW 112. It should be noted that the RGW 112 is configured to convert and package the analog voice-band signals generated from the analog telephony devices (ATDs) such as the analog wired phone 114 or the cordless analog phone 116, using an interface unit (not shown) such as a coder/decoder (codec), analog telephone adapter (ATA), transcoder, or the like, as would be appreciated by one of ordinary skill in accordance with a VoIP protocol. The RGW 112 is connected to the broadband network 118 with a high-speed network connection such as a digital subscriber line (DSL), cable modem, T1/T5 line, or the like. It will be appreciated that broadband network 118 can include one or a combination of a private network using Internet Protocol (IP), an asynchronous transfer mode (ATM) network, the Internet, a PSTN, and the like.

As will be discussed in greater detail hereinafter, the RGW 112 typically provides communication to and from a remote device, such as analog phone 120, with the assistance various network devices including three main components: a media gateway (MG) such as trunk MG 126, a media gateway controller (MCG) such as MGC/proxy server 122 and a signaling gateway such as signal or signaling gateway 124. The trunk MG 126 provides mapping and translating functions of protocol data associated with packets passing through the broadband network 118 originating from analog telephony devices such as analog wired phone 114 or cordless analog phone 116. It will be appreciated that services performed by the RGW 112 are both analog oriented and digital oriented in nature and can include, for example, echo cancellation on the analog side and packet media termination on the digital side for terminating and processing packets coming from broadband network 118. The RGW 112 operates in a full-duplex mode, by simultaneously processing analog voice band signals originating in the ATDs and converting the analog voice band signals to packet data, as described above, for transmission to a remote destination and by processing digital packets received from the remote destination over the VOP network and translating them to voice band energy for listening by a user of the ATDs.

It will be appreciated that the signaling gateway 124 can provide the internetwork protocol signaling, for example, between a PSTN protocol associated with a PSTN 128 and VOP or VoIP protocol as may be used in the broadband network 118. The signaling gateway 124 translates signaling tones generated for example, between analog telephone 114 or cordless analog telephone 116 and analog telephone 120, to supervisory data such as signaling system 7 (SS7) data, call progress data, switching data or the like, as may be necessary for including in or together with the voice data packets sent over the broadband network 118. The media gateway controller 122 can further facilitate operation of the RGW 112 and the signaling gateway 124 by managing proxies or alternate addresses for packets destined for one or the other side of the call between analog phone 120 and analog phone 114 or cordless analog phone 116. The media gateway controller 122 can further be responsible for processing protocol messages, performing security and user authentication, and monitoring processing resources.

To better understand generally how a voice call may be placed between the analog phone 114 or the cordless analog phone 116 and remote analog phone 120 through the PSTN 128 and a central office 130 reference is again made to FIG. 1. The RGW 112, as will be appreciated, can be equipped to provide all aspects of the plain old telephone system (POTS) style analog interface such as an analog dial tone, a "battery" signal, dialed digit dual tone multi-frequency (DTMF) collection, voice band channel, and the like. The analog interface is provided locally or, from the perspective of the PSTN 128, remotely. Assuming the call is originated from one of the analog phone 114 or the cordless analog phone 116, a user with pick up the receiver or handset and place the phone into an off-hook condition.

The RGW 112, through a device, such as a loop current sensor or the like (not shown), will detect that the phone is off-hook and will provide dial tone and battery voltage to the analog phone 114 or cordless analog phone 116. The phone can then be used to dial a telephone number of a called party using a keypad or other mechanism such as a redial mechanism or from a soft interface such as a user interface associated with the ATD. It will be appreciated that in many instances, the dialing will take the form of generation of tones, such as DTMF tones, each indicating a series of digits and a sequence corresponding to the telephone number being dialed. However, other dialing mechanisms are possible such as making and breaking the current loop connection (hook switch) as is used for pulse dialing, or possibly the generation of called party information through voice band data transmission from the ATD to the gateway.

The RGW 112 meanwhile will collect the dialed digits and pass them to the broadband network 118 using a session initiation message exchange such as a session initiation protocol (SIP) message as is known in the art. The SIP message can be used to establish through one or more of the trunk MG 126, the MGC/proxy 122, and the signal gateway 124, a connection from the IP domain to the PSTN 128 to complete the call through the central office 130 by translating the collected digits to a called party destination, such as the analog phone 120. Once the call is established, the trunk MG 126 maintains seizure of the analog connection and provides real-time two-way packet communications between the broadband network 118 and the analog phone 120 through the central office 130 and the PSTN 128 by translating the packets from one side of the conversation to analog and translating the other side of the conversation from analog to packet. Once the call is underway, enhanced services can be provided by transferring data modulated in a frequency shift keying (FSK) format to an enhanced services compliant telephone as will be described in greater detail hereinafter. It will also be appreciated that additional enhanced services can be provided without the necessity of going off-hook or actually conducting a call, such as services associated with configuration and provisioning.

The enhanced services discussed and described herein can be provided to a user based on an enhanced services display message protocol (ESDMP). The ESDMP consists of various messages with reserved message types and reserved parameter types. The reserved message type can be of the type MESSAGETYPE_MSG <hexadecimal high level message type code> as will be described, and the parameter type can be of the type PARAMETER TYPE_PARAM <hexadecimal high level parameter type code> as will also be described. The ESDMP messages can be transmitted as voice band modulated signals, such as FSK signals, between a gateway device such as the RGW 112, and an analog telephony device (ATD) such as an analog telephone or the like. An exemplary ESDMP may include reserved message types as follows.

ESDMP Message Types

DIAGNOSTIC_MSG <0xF1>—used for sending diagnostic messages such as cable cut, no DHCP server, reboot required, and the like. The diagnostic message may also be used to accomplish certain provisioning functions such as loading a new image or new configuration of the ESDMP protocol or ATD software, remote diagnostics or the like as would be appreciated.

FEATURE-STATE_MSG <0xF2>—used for supplementary feature activation and display of feature states associated with presently performed actions associated with features or the like.

CALL-STATE_UPDATE_MSG <0xF3>—used for updating call state information provided by way of, for example, in band, and possibly out of band signaling protocols.

CONFIG_MSG <0xF4>—used for enabling/disabling certain features or capabilities identified by parameter types passed with the message. It will be appreciated that the configuration message can be used independently for each feature or capability or can be used for a group of features with a series of parameter types for each feature. The configuration message can also be asserted by a user, for example to reset an ATD to a known state. The configuration message will stimulate the generation of an acknowledge signal such as a DTMF "C" signal or the like indicating that the phone has the capability and that the capability has been properly provisioned such as properly enabled or disabled.

TEXT_MSG <0xF5>—used for relaying incoming text messages such as in connection with instant messaging (IM), short message service (SMS) or the like. It will also be appreciated that in connection with, for example, the acknowledgement of the TEXT_MSG message, an outgoing text message may be constructed and transferred to the gateway device such that a bidirectional text conversation or messaging session can be conducted.

SIP_DATA_MSG <0xF6>—used for displaying information associated with an internet session to display information received by the gateway during a session initiation protocol (SIP) handshake or exchange. Information such as the URL of the network entities involved in the SIP session can be included.

VENDOR_PROPRIETARY_MSG <0xFF>—reserved for use by ATD vendor to perform remote services such as firmware upgrades or the like.

It will be appreciated that while several exemplary messages are shown, other message types can also be included to provide a means for enhanced services display in accordance with the invention.

ESDMP Parameter Types

STATUS_INDICATOR_PARAM <0xE1>—used for controlling an indicator such as an LED. Parameter coding can include: length=1 byte, hex 0x01 to 0x05 indicates color value.

DISPLAY MODE_PARAM <0xE2>—used for controlling a secondary display characteristic such as blinking.

Parameter coding can include: length=1 byte, hex 0x0 or 0xFF indicates blinking ON/OFF.

FSK_MODE_PARAM <0xE3>—used for enabling disabling FSK transmission capability. Valid only with acknowledged configuration message CONFIG_MSG including FSK_MODE_PARAM. Parameter coding can include: length=1 byte, hex 0x00 or 0xFF indicates FSK ON/OFF.

FSK_RATE_PARAM <0xE4>—used for establishing FSK transmission rate. Valid only with acknowledged CONFIG_MSG including FSK_RATE_PARAM. Parameter coding can include: length=4 byte, hex 0x00 to 0xFF specifying the preferred FSK rate.

ESDMP_ACK_PARAM <0xE5>—used for enabling or disabling DTMF "B" acknowledgement. Valid only with acknowledged CONFIG_MSG including EDSMP_ACK_PARAM. Parameter coding can include: length=1 byte, hex 0x00 or 0xFF indicates DTMF "B" acknowledge ON/OFF.

It will further be appreciated that the ESDMP described above preferably are coded within a range designated as "reserved for network operator use." Other standard parameter type messages may also be transmitted between a gateway device and an ATD as noted in various domestic and international specifications and standards such as: "LSSGR: Voiceband Data Transmission Interface. Section 6.6;" Bellcore GR-30-Core (1994); ETSI standards 300 659 parts 1 and 1, and 3200 778 parts 1 and 2; British Telecom SIN 227, SIN 242-1 and SIN 242-2; NTT Telephone Service Interface Technical Reference Ed. 5; Bell Canada BID-001, CMS and CND, Terminal to Network Interface April 1994; Chinese YDN 0690-1997, and the like.

With reference to FIG. 2, an exemplary gateway 200, which can be a residential gateway such as RGW 112, or the like, can contain a processor 210 with a memory 211 and one or several analog interface units 220 for interfacing to ESDMP compliant ATDs such as an analog telephone or cordless analog telephone, or other device such as an enhanced services display device or the like capable of connecting to an analog pair such as a tip/ring pair 222. The interface unit 220 preferably allows analog voice band signals generated by the ATD coupled to the tip/ring pair 222, to be converted into digital data using a conversion device such as a subscriber line interface circuit (SLIC), a subscriber line access circuit (SLAC), a code/decode unit (CODEC) or the like as would be appreciated by one of ordinary skill. The resulting digital data from the converted voice band signals can be packaged by the gateway device 200 by encapsulating the converted voice data into packets and transmitting the packets to a destination once a session has been established using a SIP message as previously described. Further, packets received from across the VOP network from the destination can be decapsulated and converted into voice band signals by the interface units 220 working with the processor 210. It will be appreciated that the packaging and un-packaging of digital data can be performed by the gateway device 200 through the operation of a software routine or other programmed procedure or the like. It will further be appreciated that the processor 210, including the memory 211, can further be embodied as a controller, an integrated circuit or as a combination of such elements.

In order to implement the ESDMP and allow a compliant ATD to provide enhanced services display, the processor 210 can be configured to assemble a protocol message of a particular kind, as will be described in greater detail hereinafter, and pass the message to the ESDMP compliant ATD using a modulation method such as FSK over the voice band channel. In particular, the processor 210, or a suitable component of the gateway device 200 such as the interface unit 220, or a combination of components can be configured, such as through the implementation of a voice band data (VBD) state machine module or the like. The module can produce various output signals based on the current state and additional inputs. The gateway device 200, at power up can determine whether ESDMP services are required and, if so, can instantiate state machine support for the ESDMP. Further, the scope of the ESDMP services can be expanded by expanding support in the greater network. For example, management software such as the Xandros Management Console (XMC) in various network servers that the gateway device 200 is coupled to, can be provided with enhancements and extensions to provide mid-call update capabilities and additional protocol components and the like to provide new services which can be supported in the ESDMP such as short message service (SMS) for text messaging or instant messaging (IM). Further, the ESDMP can be configured to display SIP URLs associated with session set-up, and other information. Still further, the ESDMP can be configured to provide the capability to send ESDMP messages to the ATD regarding the health of other modules in the gateway 200 allowing greater overall diagnostic and trouble shooting capability.

In any case, the processor 210 operating in connection with other components in the gateway device 200 can prepare and send ESDMP messages over the voice channel to the ATD. For example, digital signals for generating a voice band data message can be sent to the interface unit 220 associated with the ATD where enhanced services display is desired and the signals converted to an analog voice band signal having the desired modulation. The compliant ATD will convert the modulated signal and recognize the signal as an ESDMP message and process it accordingly to provide a corresponding information display or other indication or service in the ATD. The ESDMP message contains parameter values that will determine what action the ATD should take.

To better understand the operation of the gateway device 200 in communicating with an exemplary ATD using the ESDMP, a message flow diagram is shown in FIG. 3. In order to begin to use the enhanced services format, a gateway needs to confirm that the ATD is compliant with the ESDMP. Whether the ESDMP compliant ATD, or other ATD, is on or off hook, a gateway such as the gateway device 200 can confirm compliance and begin operation in accordance with the ESDMP by alerting the ATD with an ALERT 301. The alert can be conducted in a number of known ways such as by presenting an open switch interval (OSI) toward the ATD, by effecting a battery reversal, by sending a voice band data message using FSK modulation, or the like. The ATD can respond to the ALTERT 301 by sending an acknowledge signal (ACK) 302, which can include a signaling tone, an unreserved DTMF tone such as DTMF "B," or some other indication such as a voice band data message such as an ESDMP_COMPLIANT message modulated using FSK.

Upon acknowledgement by the ATD of compliance with the ESDMP, the gateway device can transmit any one of a number of messages designed to facilitate the provision of enhanced services. However, prior to providing the services, the gateway device should know what specific services the ESDMP compliant ATD is capable of. It will be understood that during the lifetime of a particular model of ESDMP compliant ATD, additional features may be added to the suite of enhanced services. Therefore, to ensure the exact set of features that the ATD is compliant with, the gateway device may further query the ATD as to its capability. Accordingly, a CONFIG_MSG 303 can be sent to the ATD from the gateway device with an ESDMP parameter indicating, for example, a specific ESDMP feature of Type 1. If the ATD supports the feature Type 1, then an acknowledgement can be generated such as a CONFIG_ACK 304, which will acknowledge that the ATD does support the feature of Type 1. The CONFIG_ACK 304 can include a signaling tone such as a DTMF "C" tone reserved for voice band data message acknowledgement, or a voice band data message such as an ESDMP_CONFIG_ACK message modulated using FSK.

When an acknowledgement is received for a particular feature, the gateway device will generate another message for the next feature and so on until the last feature when a message, such as a CONFIG_MESSAGE 305, can be sent to the ATD from the gateway device with an ESDMP parameter indicating, for example, a feature of Type N associated with determining the ATD's ability to support a last feature. If the ATD supports the feature Type N, then an acknowledgement can be generated such as a CONFIG_ACK 306, which will acknowledge that the ATD does support the feature of Type N. The CONFIG_ACK 306 can include a signaling tone such as a DTMF "C" tone reserved for voice band data message acknowledgement, or a voice band data message such as an ESDMP_CONFIG_ACK message modulated using FSK. After the completion of the configuration sequence, all the possible features supported by the ATD are or should be known. It will be appreciated the above noted exchanges can occur while the telephone is idle and on-hook, or can be performed carefully during a call such as during a silent interval during ringing or during a silent interval during the voice conversation. It should also be understood that, while the configuration sequence is described as a series of configuration messages, the configuration sequence can also be accomplished with a single configuration message having a number of parameters included within the "parameter type" field. Further, the ESDMP message, when sent during an off-hook condition, will provide minimal interruption to a voice call in progress as compared for example, to a call waiting caller ID (CWCID) event involving a disruption in the voice channel to transmit an audible tone.

Alternatively, during, for example, the alert sequence described above, the ATD can independently send a series of messages with an indication of all the features it supports in a message sent in response to the ALERT 301. The response message or messages can be processed by the gateway device such that only those supported features are included in later messages that activate specific features in the ATD. In the context of the present embodiment, "activate" means that a message sent by a gateway device will cause the display of particular information or configure the ATD to display the information in a certain way, such as by blinking, or the like.

The gateway device provides enhanced services by sending messages indicating information about a call state or activating a feature state as will be described with continued reference to FIG. 3. A CALL-STATE_UPDATE_MESSAGE 307 can be sent to the ATD having information to be displayed in the enhanced services display portion of the ATD or possibly in an existing display portion or a dual purpose display portion of the ATD. Such enhanced service messages provide an up-to-date indication of what is going on with the call as will be described in greater detail hereinafter. In addition to messages related to the call state, message specifically configuring or activating a feature can be sent such as a FEATURE_STATE_MESSAGE 308. The gateway device can activate a particular feature such as call waiting or the like, using the FEATURE_STATE_MESSAGE 308. The gateway device can further cause a displayed message to blink, can change a ring tone or any number of enhanced features that may be supported by the ATD.

Figure 4:
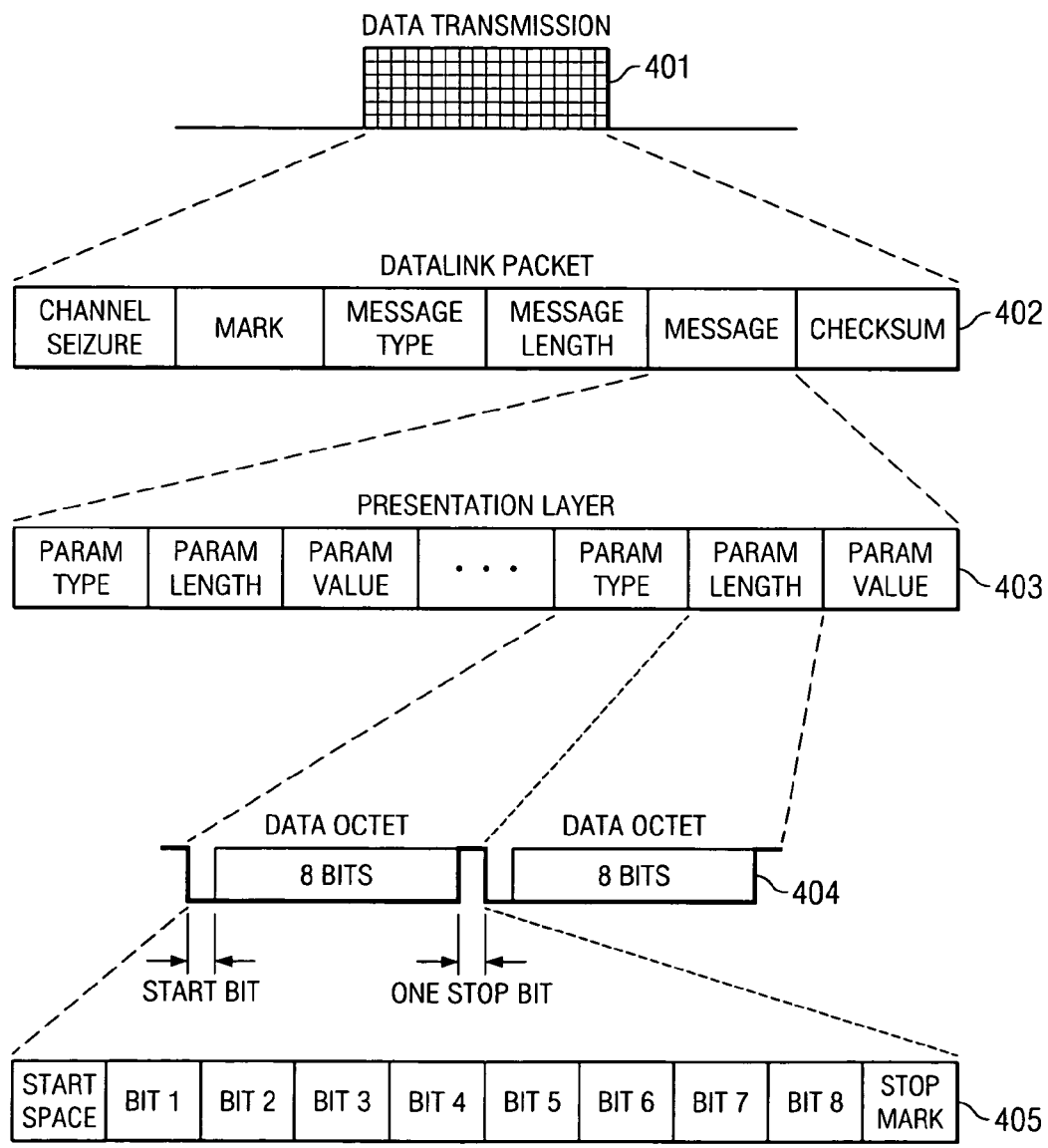
FIG. 4 is a diagram illustrating a breakdown of a message format for transmitting messages in accordance with an exemplary enhanced services display message protocol (ESDMP)

As previously noted, the information associated with messages generated and sent in accordance with the ESDMP can be sent as a voice band data message using FSK modulation or the like. A typical voice band data message format is shown in FIG. 4. A data transmission 401, which can be, for example, a voice band data transmission modulated according to FSK modulation, is sent containing various fields and parameters as would be well understood to those of ordinary skill. The data transmission 401 can be constructed according to a layered protocol common in the communications arts. Accordingly, the data transmission 401 can include a datalink packet 402, having standard components such as a channel seizure portion, a mark portion, a message type indicator, a message length indicator, the actual message contents, and a checksum. It will be appreciated that the "message type" portion of the datalink packet 401 will contain an identifier or value associated with the ESDMP message type to indicate or identify the message as one of an ESDMP message type, such as a CONFIG_MESSAGE, a CALL-STATE_UPDATE message or the like as described above and as further described herein.

The message portion is contained as a presentation layer protocol data unit (PDU) 403 encapsulated within the datalink packet 402. The presentation layer PDU 403 contains the actual message and contents and includes a series of fields associated with identifying and transmitting one or a series of parameters. For each parameter included in the presentation layer PDU 403, a parameter type field, a parameter length field and a parameter value field are included. Each parameter field includes an 8-bit value or an octet 404 including a start and a stop indicator. The breakdown of each octet can be seen in field 405 where the components of a typical octet are shown. The field 405 includes a start space to indicate the beginning of the octet which includes bit fields 1-8. At the end of the bit fields 1-8 is a stop mark to indicate the end of the octet and, in connection with the start space provide an indication of the boundaries between octets. Such an indication allows a processor or other receiving unit to properly decode and maintain synchronization with the information presented in the data transmission 401.

The ESMDP will allow a compliant ATD to present additional information to a user over and above the information associated with, for example, Caller_ID information or the like. As shown in FIG. 5, an ESDMP complaint ATD 16 can be provided with an enhanced services display (ESD) such as an ESD 58. By way of brief summary, when a user is ready to place a call the phone is placed into an off-hook state, and dial tone is provided by the gateway, such as RGW 112. The gateway attempts to establish communication with servers on the broadband network 118 via a SIP message exchange as described above. It should be noted that only upon successful provisioning and registration does the RGW 112 provide dial tone to a user. If the attempt to register fails and no dial tone is provided, an indication can be provided by way of the ESMDP since in a conventional system, a user typically would not know the cause and nature of failure for the missing dial tone. Some gateways provide voice announcements that are stored in the gateway, which increases the cost of such devices. In addition, since failure condition can also occur at times other than startup and have a variety of causes, the limited number of announcement messages stored in the flash may be inadequate to address all possible failure mode. The ESMDP can be easily adapted to provide an information display of the most up to date list of possible failure causes for display when registration fails.

Accordingly, a diagnostic message can be generated using the voice band data message format and displayed on the ESD 58 of the ATD 16. An exact cause of failure and/or missing dial tone can be determined by the RGW 112 at procedure S52, which then generates a ESDMP message at procedure S54 using a voice band data message format containing an informative/diagnostic message containing the reason for failure. Exemplary messages S56 that can be displayed on the ESD 58 include:

"Failure to Provision"
"Unable to Register"
"Service Disconnected"
"Check Cable"
"Unable to Obtain IP Address"
"DNS not Available"
"Proxy Unreachable"
"Downloading Config"
"Reboot the Gateway"
"Return GW to Provider"

One of ordinary skill will recognize that as other failure causes become known, they can be added to the list of messages.

The ESD display 58 on the ATD 16 can also be used to display messages when a user enacts a telephony service feature. It will be appreciated that while an IP Phone or business phone typically has function keys such as "Transfer," "Forward" and "Conference," or enables the use of such feature in conjunction with a display by way of soft keys or the like, access to such features is accomplished in a different manner on a typical ATD. The entry of feature codes such as "*xx," is required where "xx" are two digit codes or other events/actions such as hook-flash, or the like. A confirmation is provided by the system such as the PSTN, via a confirmation tone or a distinctive dial tone or the like, which confirms that a valid code was dialed. In the case of enhanced services provided by the VOP network, other mechanisms may be used such as an FSK modulated, voice band data message. It should be noted that a confirmation only indicates that a valid feature code has been dialed. Actual activation of the desired feature can be verified when the feature is used. Alternatively, additional messages can be generated using the ESMDP for indicating that a feature is temporarily unavailable or the like.

When a call is properly registered and dial tone is established, a call may be placed or a service feature activated in a normal manner. The ESDMP can provide enhanced display of service feature activation as will be described. In connection with an ESDMP compliant ATD such as the ATD 16, conventional confirmation tones and distinctive dial tones from the PSTN should continue to be supported. However, the ATD 16 will preferably confirm the user action or feature activation on the ESD display 58. With reference to FIG. 6, when a user activates a feature on the ATD 16, the RGW 112 will pass the tones to the PSTN or, in the case of an enhanced service associated with the ESDMP, the RGW 112 will generate a message such as a CALL-STATE_UPATE message, which can be an FSK modulated voice band data message and send the message to the ATD 16 for display on the ESD display 58. The content of the message will provide information that will allow a user to confirm that a valid code was entered and the desired feature was activated. An exemplary list of information capable of being displayed on the ESD display 58 is as follows:

*72=>"CF Unconditional"
*74=>"CF on Busy"
*75=>"CF on No Answer"
*72=>"CF Cancel"
*67=>"CID Blocked"
*69=>"CID Unblocked"
*70=>"W Disable/Enable"
90=>"Xfer Call"
91=>"Xfer with Consult"
*77=>"ACB Enable" (Anonymous Call Block Enable)
*87=>"ACB Disable" (Anonymous Call Block Disable)
*78=>"Do Not Disturb"
"5"=>"RPT Dial Active"
"911"=>"Emergency Call"
"hook-flash"=>"Call-1 on Hold" or "Conferencing" depending on the action sequence One of ordinary skill will recognize that as additional features become known and used, they can be added to the list of messages.

After a call is connected, RGW 112 will pass ESDMP messages in order to make use of ESD display 58 of ATD 16 to pass call state or event updates that are or become available from the PSTN and/or broadband network 118 via notifications or other call signaling information. The RGW 112 acting as a SIP user agent (UA) can provide information on all aspects of call progress and status using various VOP and conventional signaling protocols that provide distributed call control such as SIP. It will be appreciated that the RGW 112 is actively involved in and remains aware of call state during all stages of call processing, whether for a single-party or for a multi-party call. In the case of third party call control (3PCC) available in SIP or protocols such as MGCP/Megaco, the call control is performed by the broadband network 118 and the RGW 112 may not be aware of call state during 3PCC. However, event packets can be used to update the RGW 112 of call state in case of 3PCC or when enhanced services of remote network elements are accessed. Such features and associated packets are typically defined in connection with IP Phones having advanced displays capable of displaying detailed notifications. The event packets can update the display with call state changes as determined by the signaling messages or notification received from network elements.

With reference to FIG. 7, RGW 112 receives call state or event updates signals at procedure S66, and generates a CALL-STATE_UPDATE message at procedure S68 for example as a voice band data message transferred to ATD 16 as an FSK modulated signal, which is processed by STD 16 and sent to the ESD display 58. The messages can provide detailed information associated with the call and is particularly useful in multi-party calling. During conference call, for example, ESDMP messages sent from RGW 112 may include information that can be displayed as follows:

"Bob Joined"
"Alice Dropped"
"Total participants 12"

If the RGW 112 enacts a call waiting service, for example, ESDMP messages sent from the RGW 112 may include additional information that can be displayed as follows:

"Bob on Hold" (When an identifiable user, Bob, is put on hold)
"Call-1 on Hold" (When an identifiable call is put on hold)
"Alice Dropped" (When an identifiable user on hold is disconnected)
"Call-1 Dropped" (When an identifiable call on hold is disconnected)

If certain other features are activated, such as any of Call Forwarding, Call Transfer, Call Pickup service, or the like, the RGW 112 could update ATD 16 with information to be output on ESD display 58 as follows:

"FWD to/by Bob" (When a call is transferred)
"XFER to/by Bob" (When a call is transferred)
"Picked by Alice" (When a call ringing is picked)

It will be appreciated that RGW 112 can use the session description protocol (SDP) or SIP-Invite to determine and offer, through the ESDMP, descriptions about type of call being received further actions can be taken if desired or necessary regarding the call. For example, an incoming call can include a data call such as an incoming facsimile, an incoming modem call, a TTY (text) call, or the like. Upon reception of such a call, the RGW 112 could send one of the following messages to the Caller-ID display:

"FAX Call"
"Modem Call"
"Data Call"
"TTY Call"
"Text Call"

The ESD display 58 may also support text messaging from an incoming text call, with or without conventional speech-to-text conversion service either on the ATD 16, the RGW 112 or the broadband network 118 can be used to enable a text replay or to enable a teletype, text terminal, or the like (TTY) capability to complete the service. The present embodiment provides an ESDMP to provide enhanced services display over and above conventional message formats such as multiple data message format (MDMF), or the like as described in connection with the documents previously referenced herein such as: "LSSGR: Voice band Data Transmission Interface. Section 6.6," Bellcore GR-30-Core (1994); European Telecommunications Standards Institute (ETSI) standards 300 659 parts 1 and 2, 3200 778 parts 1 and 2; British Telecom SIN 227, SIN 242-1 and SIN 242-2; NTT Telephone Service Interface Technical Reference Ed. 5; Bell Canada BID-001, CMS and CND, Terminal to Network Interface April 1994; Chinese YDN 0690-1997, and the like. The ESDMP provides message types requiring a proprietary ATD with an enhanced display so that the problems associated with providing enhanced messages using the conventional message types do not overload the convention Caller_ID display. Each individual message transmitted using approaches, such as using the Caller_ID format for the display of additional information, will treated by a phone as accompanying an incoming call and will be recorded by a conventional Caller_ID display as such. Actual caller information on the conventional Caller-ID list will become cluttered and intermixed with additional information, which will need to be deleted manually to restore clarity to the existing display of caller information. By defining the ESDMP, with new message types in accordance with the present invention, a desirable separate treatment for the ESDMP messages can be achieved with an ESDMP compliant ATD having and enhanced services display and perhaps other enhanced services capability such as sound, camera, lamps, or the like. However, it should be emphasized that the customized messaging provided by way of the ESDMP requires compliant devices and thus does not support universal interoperability. However, with an ESDMP compliant device, using the RGW 112 and the ATD 16 in a home can provide services which approximate those possible using, for example, a business IP Phone. Accordingly, the interface unit 220 between the ATD and gateway processor 200 need not be limited to conventional 2-wire interfaces but could include the equivalent of a private branch exchange (PBX) or other device.

It will be appreciated that the present invention can be implemented as a method in a computer or processor equipped with the appropriate interfaces capable of generating voice band data such as FSK modulated data. Various exemplary procedures, as shown in FIG. 8, FIG. 9 and FIG. 10, can be implemented in a number of ways by way of a device facilitating the connection of an analog ATD and a VOP network, such as through a software program executing on a general purpose computer and connected to the ATD through an analog interface unit such as an analog telephone adapter (ATA) and connected to a VOP network through a network interface unit, a software program operating on a processor configured specifically for carrying out the procedures such as within a dedicated gateway device, an integrated circuit specifically designed to carry out the exemplary procedures such as within a dedicated gateway device, or some combination of the above components.

With reference to FIG. 8, an exemplary initialization sequence or handshake procedure is shown. After start at 801, an exemplary gateway device can send an alert signal at 802, such as an OSI or battery reversal to the ATD over the voice channel, analog pair, or the like as described above. It will be appreciated that the alert signal may be part of a conventional alert designed to precipitate a dialog between the gateway device and the ATD. If the ATD is an ESDMP compliant ATD, then an acknowledge signal can be provided also as described above in the form of an FSK modulated voice band data message or a signaling tone such as a DTMF "B," which identifies the ATD as ESDMP compliant. If the ATD is compliant, and an acknowledge signal is received at 803, then the gateway can be configured to provide and otherwise activate enhanced services in the ATD according to the ESDMP protocol at 804. If no acknowledge signal is received at 803 or if a signal is received indicating non-compliance with the ESDMP, then the gateway can be configured to provide normal operation and messaging with the ATD. Normal messaging means conducting normal operations, such as transferring Caller_ID information, using the voice band channel for any exchange of signaling information or the like being transferred between the ATD and a remote ATD through a PSTN or the like.

With reference to FIG. 9, an exemplary configuration procedure is shown. After start at 901, an exemplary gateway device, after conducting the handshake procedure as shown in FIG. 8, can determine whether the ATD is ESDMP compliant at 902. If the ATD is ESDMP compliant, a CONFIG_MSG can be provided to the ATD at 903 as a voice band data message using the voice band data message format shown and described in connection with FIG. 4 and modulated using, for example, FSK modulation as described herein. The CONFIG_MSG will typically be associated with a service "n," which is provisioned in the gateway device, or can contain. references to a number of services or parameters. It will be appreciated that the CONFIG_MSG can be sent and then acknowledged by the ATD through the generation of a signal such as a DTMF "C" signal. If an acknowledge signal is received at 904, then the associated service can be activated at 905. If no acknowledge signal is received or if a negative acknowledge signal is received the particular service, service "n," can be disabled. It will be appreciated that by activating or disabling the service, the gateway device will send ESDMP messages or will refrain from sending ESDMP messages based on an acknowledgement from the ATD indicating that the service is supported. At 907 "n" can be incremented. If more services are present to be configured at 908, then the configuration operation can continue at 909 by either sending another CONFIG_MSG at 903 and repeating 904-908, or alternatively, the original CONFIG_MSG can contain all the parameters in a multi-parameter type message as shown and described in connection with FIG. 4. If no additional services are being configured at 908, then the procedure can end at 910. It will be appreciated that by referring to the end of the procedure at 910, reference is made to the conclusion of one such configuration procedure. Additional configuration procedures can be conducted at various times as necessary without departing from the invention. Further, the configuration procedure can be conducted with the ATD being in an on-hook or off-hook condition although on-hook is a preferable state for conducting configuration operation.

Figure 10:
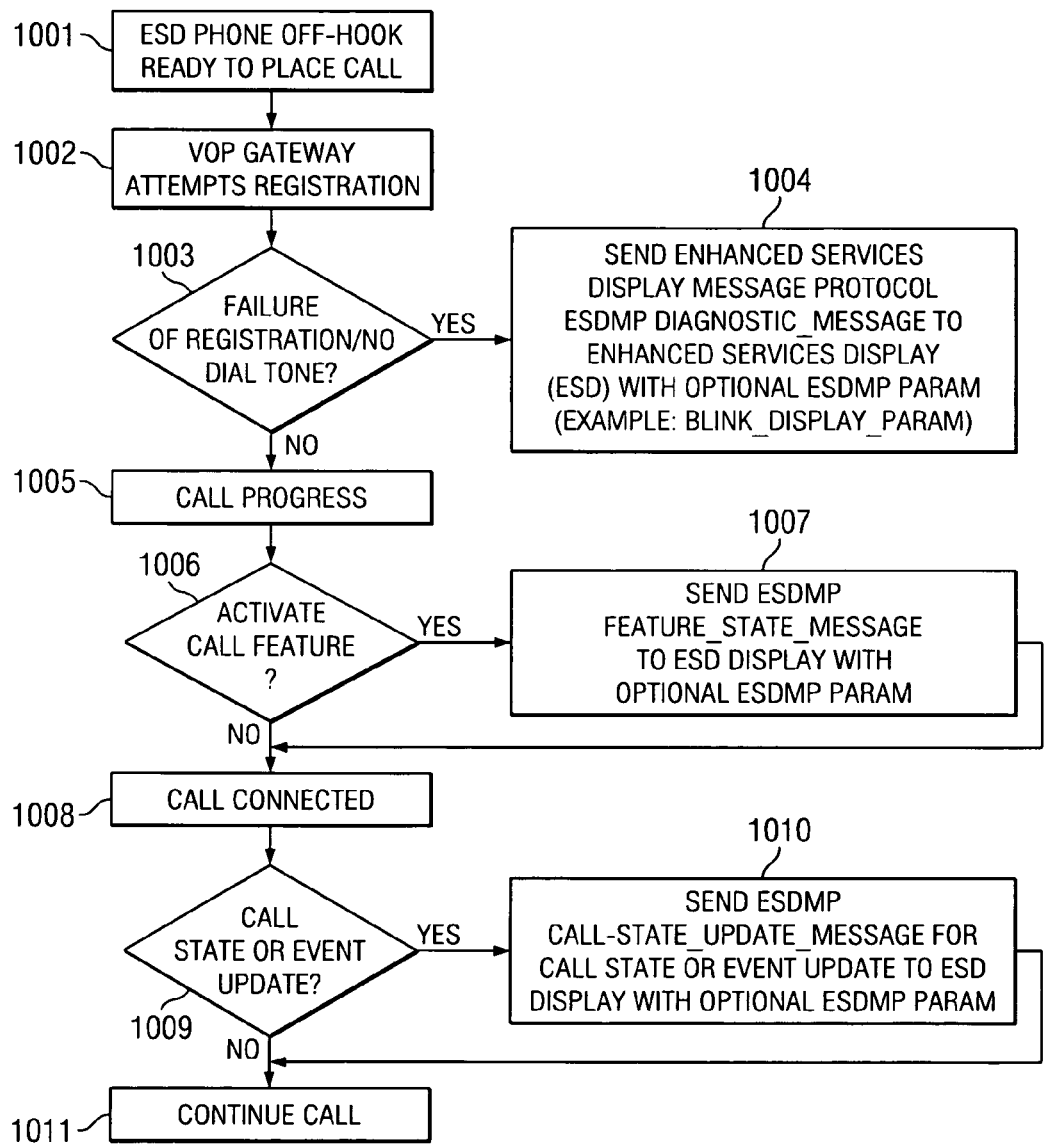
FIG. 10 is a flow chart illustrating an exemplary ESDMP compliant ATD and procedures for using a voice band data message format generated from a gateway device to display messages to notify a user of a call state or event update.

With reference to FIG. 10, an exemplary procedure for updating the ESDMP compliant ATD with call feature and call state information is shown. After conducting the handshake procedure as shown in FIG. 8, and any configuration procedures as shown in FIG. 9, the ATD can go into an off-hook condition at 1001. At 1002, the gateway device can attempt a registration with the VOP network by sending, for example, a SIP message used to initiate a network session as will be appreciated. If the registration fails as determined at 1003, the gateway can send an ESDMP diagnostic message to the ATD for display on the enhanced services display (ESD) at 1004 indicating the loss of or failure to register. It will be appreciated that with the ESDMP, additional features can be activated such as blinking of the display and the like.

If the registration is successful, the call can progress at 1005 and voice or other data can be passed between the ATD and its called party or calling party. At 1006, it can be determined whether a call feature is activated. If so, the gateway can send an appropriate ESDMP message, such as a FEATURE-STATE_UPDATE_MSG, to the ATD for display on the ESD indicating the activation of the feature state at 1007, whereupon the procedure continues to check at 1008 whether the call is still connected. If so, then it can be determined whether a call-state or event has occurred requiring updating the ATD with the new call-state information or other event information at 1009. If an event, call-state change or the like has occurred at 1010, the gateway can send an appropriate ESDMP message, such as a CALL-STATE_UPDATE_MSG, to the ATD for display on the ESD. It will be appreciated that in the exemplary procedure, parameters can be included as described herein to provide blinking or other display modes. Alternatively, the parameters can cause an indicator lamp, LED or the like to flash or light or can cause a speaker to provide a sound such as a voice recording or the like. It will further be appreciated that while certain message type names and parameter type names are used herein, other names can be used to describe enhanced services message types and parameter types or, to some extent, different enhanced services messages can be used without departing from the invention.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A gateway device for connecting an analog telephony device (ATD) to a voice over packet (VOP) network, the gateway device comprising:
   a controller;
   a first interface coupled to the controller, the first interface configured to enable the gateway device to transmit and receive packets over the VOP network; and
   a second interface coupled to the controller and the first interface, the second interface configured to enable the ATD to transmit and receive voice-band communications over an analog telephone network though the gateway device, the ATD capable of processing an enhanced services display (ESD) message in accordance with an enhanced services display message protocol (ESDMP) using a voice band data message format to provide an enhanced service in addition to a standard service,
   wherein the controller is configured to detect if the ATD is capable of operating according to the ESDMP, and to transmit the ESD message to the ATD in accordance with the ESDMP to provide the enhanced service if the controller detects that the ATD is capable of operating according to the ESDMP.

2. The gateway device of claim 1, wherein the controller is further configured to detect that the ATD is capable of operating in accordance with the ESDMP by presenting a signaling condition to the ATD over the second interface, the signaling condition for causing the ATD to provide an indication of being capable of operating according to the ESDMP.

3. The gateway device of claim 2, wherein the controller is further configured to detect that the ATD is capable of operating in accordance with the ESDMP by processing an acknowledgement signal transmitted on the second interface from the ATD for identifying the ATD as being capable of operating according to the ESDMP.

4. The gateway device according to claim 2, wherein the controller is further configured to provide the signaling condition as one of an open switch interval (OSI), a battery reversal, a frequency shift keying (FSK) signal, and a signaling tone.

5. The gateway device according to claim 3, wherein the acknowledgement signal includes one of a dual tone multi frequency (DTMF) B signal, a frequency shift keying (FSK) signal, and a signaling tone.

6. The gateway device according to claim 1, wherein the voice band data message format includes a message type field identifying to the ATD that the ESD) message is not a CALLER_ID message.

7. The gateway device according to claim 1, wherein the voice band data message format includes an ESD message type identifying to the ATD a type of the enhanced service.

8. The gateway device according to claim 7, wherein the ESD message type includes one of a CONFIG_MSG message type, a FEATURE-STATE_MSG message type, a CALL-STATE_UPDATE_MSG message type, a DIAGNOSTIC_MSG message type, a TEXT_MESSAGE message type, a session initiation protocol (SIP)_DATA message type, and a VENDOR-PROPRIETARY_MSG message type, the ESD message type for identifying a first action to be taken by the ATD in connection with providing the enhanced service.

9. The gateway device according to claim 7, wherein the voice band data message format further includes an ESD parameter type identifying to the ATD a parameter associated with the type of the enhanced service.

10. The gateway device according to claim 9, the ESD parameter type including one of a STATUS_INDICATOR_MODE_PARAM parameter type, a DISPLAY_MODE_PARAM parameter type, an FSK_MODE_PARAM parameter type, a FSK_RATE_PARAM parameter type, a ESDMP_ACK_PARAM parameter type, and a VENDOR_PROPRIETARY_PARAM parameter type, the ESD parameter type for identifying a second action to be taken by the ATD in connection with providing the enhanced services.

11. A method for enabling an enhanced services display (ESD) associated with an analog telephony device (ATD) coupled to a voice over packet (VOP) network through a gateway device, the ESD for providing an enhanced service, the method comprising:
determining if the ATD is capable of processing a message in accordance with an enhanced services display message protocol (ESDMP); and
sending an ESD message to the ATD in accordance with the ESDMP if the determination is affirmative that the ATD is capable of processing the message in accordance with the ESDMP,
wherein:
the ESD message is sent using a voice band data message format, the ESD message being identified so as to cause the ATD to process the ESD message differently than a Caller_ID message; and
the enhanced service is different from a Caller_ID service.

12. The method according to claim 11, wherein the determining includes conducting an ESD handshake operation to cause the ATD to indicate a capability of operating according to the ESDMP.

13. The method according to claim 11, wherein the determining includes transmitting an ESD signaling condition to the ATD.

14. The method according to claim 13, wherein the determining further includes receiving an acknowledgement that the ATD is capable of processing the message in accordance with the ESDMP.

15. The method according to claim 13, wherein the ESD signaling condition includes one of an open switch interval (OSI), a battery reversal, a frequency shift keying (FSK) signal, and a signaling tone.

16. The method according to claim 14, wherein the acknowledgement includes one of a dual tone multi frequency (DTMF) B signal, a FSK signal, and a signaling tone.

17. A computer readable medium having instructions for execution by a processor in a gateway device for connecting to a voice over packet (VOP) network over a first interface, the instructions for enabling the processor to:
generate a signaling condition through a second interface configured to couple to an analog telephony device (ATD) capable of providing enhanced services display (ESD) different from a Caller-ID display, the signaling condition associated with an enhanced services display message protocol (ESDMP), the signaling condition for causing the ATD, if present, to identify itself as being capable of operating according to the ESDMP; and
process an acknowledgement from the ATD if present, the acknowledgement identifying the analogy telephony device as being capable of operating according to the ESDMP.

18. The computer readable medium according to claim 17, wherein the instructions further enable the processor to transmit an ESD message in accordance with the ESDMP using a voice band data message format so as to cause the ATD to provide an enhanced service different from a Caller-ID service.

19. The computer readable medium according to claim 17, wherein the signaling condition includes one of an open switch interval (OSI), a battery reversal, a frequency shift keying (FSK) signal, and a signaling tone.

20. The computer readable medium according to claim 18, wherein the acknowledgement includes one of a dual tone multi frequency (DTMF) B signal, a frequency shift keying (FSK) signal, and a signaling tone.

21. The computer readable medium according to claim 19, wherein the ESD message in accordance with the ESDMP protocol includes an ESD message type identifying to the ATD a type of the enhanced service.

22. The computer readable medium according to claim 21, wherein the ESD message type includes one of a CONFIG_MSG message type, a FEATURE-STATE_MSG message type, a CALL-STATE_UPDATE_MSG message type, a DIAGNOSTIC_MSG message type, a TEXT_MSG message type, a session initiation protocol (SIP)_DATA_MSG message type, and a VENDOR-PROPRIETARY_MSG message type, the ESD message type for identifying a first action to be taken by the ATD in connection with providing the enhanced service.

23. The computer readable medium according to claim 21, wherein the ESD message in accordance with the ESDMP protocol includes an ESD parameter type identifying to the ATD a parameter associated with the type of the enhanced service.

24. The computer readable medium according to claim 23, wherein the ESD parameter type includes one of a STATUS_INDICATOR_MODE_PARAM parameter type, a DISPLAY_MODE_PARAM parameter type, an FSK_MODE_PARAM parameter type, a FSK_RATE_PARAM parameter type, a ESDMP_ACK_PARAM parameter type, and a VENDOR_PROPRIETARY_PARAM parameter type, for identifying a second action to be taken by the ATD in connection with providing the enhanced services.

25. The gateway device according to claim 2, wherein the controller is further configured to provide the signaling condition as one of an open switch interval (OSI), a battery reversal, and a signaling tone.

26. The gateway device according to claim 3, wherein the acknowledgement signal includes one of a dual tone multi frequency (DTMF) B signal and a signaling tone.

27. The computer readable medium according to claim 17, wherein the signaling condition includes one of an open switch interval (OSI), a battery reversal, and a signaling tone.

28. The computer readable medium according to claim 18, wherein the acknowledgement includes one of a dual tone multi frequency (DTMF) B signal and a signaling tone.

29. The method according to claim 13, wherein the ESD signaling condition includes one of an open switch interval (OSI), a battery reversal, and a signaling tone.

30. The method according to claim 14, wherein the acknowledgement includes one of a dual tone multi frequency (DTMF) B signal and a signaling tone.

* * * * *